(12) United States Patent
Takenaka et al.

(10) Patent No.: US 11,474,521 B2
(45) Date of Patent: Oct. 18, 2022

(54) MAINTENANCE SUPPORT SYSTEM AND TERMINAL USED IN THE SAME

(71) Applicant: SEIKO EPSON CORPORATION, Tokyo (JP)

(72) Inventors: Ryota Takenaka, Matsumoto (JP); Takao Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 16/803,652

(22) Filed: Feb. 27, 2020

(65) Prior Publication Data

US 2020/0278678 A1    Sep. 3, 2020

(30) Foreign Application Priority Data

Feb. 28, 2019  (JP) ............................. JP2019-035561

(51) Int. Cl.
| | | |
|---|---|---|
| *G05D 1/00* | (2006.01) | |
| *B64C 39/02* | (2006.01) | |
| *G05D 1/10* | (2006.01) | |

(52) U.S. Cl.
CPC ......... *G05D 1/0094* (2013.01); *B64C 39/024* (2013.01); *G05D 1/0088* (2013.01); *G05D 1/104* (2013.01); *B64C 2201/12* (2013.01); *G05D 2201/0207* (2013.01)

(58) Field of Classification Search
CPC .... G05D 1/0094; G05D 1/0088; G05D 1/104; G05D 1/0297; G05D 1/0027; B64C 39/024; B64C 2201/12; B64C 2201/126; G08B 25/14; G03B 21/12; Y10S 901/01
See application file for complete search history.

(56) References Cited

U.S. PATENT DOCUMENTS

| | | | |
|---|---|---|---|
| 9,454,157 B1* | 9/2016 | Hafeez | ................. G08G 5/0056 |
| 10,308,047 B1* | 6/2019 | Wang | ..................... G06K 15/02 |
| 10,372,127 B2* | 8/2019 | Chefalas | ............... B64C 39/024 |
| 2013/0275313 A1* | 10/2013 | Vahid | ..................... G06Q 10/20 |
| | | | 705/305 |
| 2016/0247404 A1* | 8/2016 | Srivastava | ............ B64C 39/024 |
| 2017/0057081 A1* | 3/2017 | Krohne | ..................... B25J 9/08 |
| 2017/0278312 A1 | 9/2017 | Minster et al. | |
| 2018/0203469 A1* | 7/2018 | Cohen | .................... G08B 21/02 |
| 2018/0231972 A1* | 8/2018 | Woon | ..................... G05D 1/0808 |
| 2018/0307045 A1* | 10/2018 | Nishi | ..................... G06V 20/20 |
| 2019/0150167 A1* | 5/2019 | Lee | .................. H04W 72/1231 |
| | | | 705/7.24 |
| 2020/0055597 A1* | 2/2020 | Fujimoto | ........... G08B 13/1965 |

FOREIGN PATENT DOCUMENTS

JP    2018-181232    11/2018

\* cited by examiner

*Primary Examiner* — Christian Chace
*Assistant Examiner* — Shayne M. Gilbertson
(74) *Attorney, Agent, or Firm* — Workman Nydegger (57) ABSTRACT

A maintenance support system includes a terminal to be connected to one or more devices and one or more autonomous mobile bodies configured to acquire an own location, and transmits abnormality information from an abnormal device to the autonomous mobile body. The autonomous mobile body travels to a location of the abnormal device, based on the abnormality information.

11 Claims, 3 Drawing Sheets

MAINTENANCE SUPPORT SYSTEM AND TERMINAL USED IN THE SAME

The present application is based on, and claims priority from JP Application Serial Number 2019-035561, filed Feb. 28, 2019, the disclosure of which is hereby incorporated by reference herein in its entirety.

BACKGROUND

1. Technical Field

The present technique relates to a maintenance support system for devices in a factory and a terminal used in the system.

2. Related Art

As a related-art document disclosing a maintenance support system of this type, JP-A-2018-181232 is known. JP-A-2018-181232 discloses a maintenance support device including a display control unit that displays an augmented reality image on a display unit of a head-mounted display device (smart glass or the like), the augmented reality image being obtained by superposing an additional image indicating maintenance information on a device determined to have an abnormality.

When an abnormal device with a failure of some kind is present in a large factory having a floor area on which a number of devices are installed, a maintenance worker goes to a location of the abnormal device to perform maintenance work for the abnormal device. However, some other devices are also installed near the location, and hence it is not easy to grasp the installation location of the abnormal device being a maintenance target, which causes a problem in that it takes time for the maintenance worker to arrive at the location of the abnormal device. In JP-A-2018-181232, such problem is not considered.

Further, the technique described in JP-A-2018-181232 requires a worker to wear the head-mounted display device while performing the work. Since a field of view of the worker is limited during the work, in actual maintenance work, the worker may take off the device from the head to perform the work, and a problem of workability still remains.

SUMMARY

A maintenance support system according to the present disclosure includes a terminal configured to manage device location information relating to a plurality of devices present in a maintenance support region and receive abnormality information from an abnormal device among the plurality of devices, and one or more autonomous mobile bodies configured to receive an instruction signal transmitted from the terminal, wherein the terminal transmits the abnormality information to the autonomous mobile body when receiving the abnormality information, and the autonomous mobile body travels to a location of the abnormal device, based on the abnormality information.

DESCRIPTION OF EXEMPLARY EMBODIMENTS

First, the present disclosure will be schematically described.

In order to solve the above-mentioned problem, according to a first mode of the present disclosure, a maintenance support system, includes a terminal configured to manage device location information of a plurality of devices present in a maintenance support region and receive abnormality information from an abnormal device among the plurality of devices, and one or more autonomous mobile bodies configured to receive an instruction signal transmitted from the terminal, wherein the terminal transmits the abnormality information to the autonomous mobile body when receiving the abnormality information, and the autonomous mobile body travels to a location of the abnormal device, based on the abnormality information and the device location information.

Here, the term "the abnormality information" corresponds to at least location information of the device with an abnormality, and may contain abnormality types.

According to the present mode, when receiving the abnormality information of the device, the terminal transmits the abnormality information to the autonomous mobile body. Moreover, the autonomous mobile body compares the abnormality information with the device location information, specifies the location of the abnormal device, and travels to the location. With this, a maintenance worker can make a move with the autonomous mobile body as a guide, and hence can quickly grasp the location of the abnormal device and go to the location.

According to a second mode of the present disclosure, in the maintenance support system of the first mode, at least one of the autonomous mobile bodies includes at least one of a sound-generating unit configured to generate sound and a light-emitting unit configured to emit light at least after traveling to the location of the abnormal device.

According to the present mode, the autonomous mobile body includes at least one of the sound generation portion and the light-emitting portion, and hence can inform a maintenance worker of the location of the abnormal device by generating one of or both sound and light after traveling to the location of the abnormal device. With this, a maintenance worker can easily recognize the location of the autonomous mobile body, and hence can quickly go to the location of the abnormal device.

Note that, not only after traveling to the location of the abnormal device but also during the travel, one or both of sound and light may be generated.

According to a third mode of the present disclosure, in the maintenance support system of the first mode or the second mode, at least one of the autonomous mobile bodies includes a projection unit configured to project an image of a moving image or of a still image, and the image includes maintenance information relating to an abnormality solution for the abnormal device. Here, the term "the maintenance information" may contain information of a maintenance tool required for maintenance work or the like in addition to information in a form of characters, figures, images, and moving images, which relates to a work content, a work procedure, and the like required for each maintenance work.

According to the present mode, the projection unit is configured to project the maintenance information relating to an abnormality solution for the abnormal device. With this, a maintenance worker can grasp the work content and the work procedure for maintenance from the maintenance information projected on the location of the abnormal device. With this, a maintenance worker can perform maintenance work effectively because the worker does not need to browse documents and the like during the maintenance work.

According to a fourth mode of the present disclosure, in the maintenance support system of any one of the first mode to the third mode, the autonomous mobile body is configured to convey a maintenance tool.

Here, the term "the maintenance tool" indicates a tool to be used for the maintenance work, consumables, a tool such as a measure instrument, and the like.

According to the present mode, the autonomous mobile body is configured to convey the maintenance tool, and hence a maintenance worker does not need to carry the maintenance tool required for the maintenance work by his or her own. Specifically, a maintenance worker can go to the location to which the autonomous mobile body travels, that is, the location of the abnormal device, with light equipment.

According to a fifth mode of the present disclosure, in the maintenance support system of the third mode or the fourth mode, the terminal is configured to manage shape information of the devices, and includes projection location information associated with, based on the shape information, the abnormality information of the abnormal device, and the projection unit is configured to project the maintenance information, based on the projection location information.

According to the present mode, when the autonomous mobile body projects the maintenance information on the abnormal device, the projection unit performs projection, based on the projection location information. Thus, the maintenance information can be projected on the abnormal part of the abnormal device. With this, a maintenance worker can easily grasp the part with abnormality and the maintenance information. Further, by superposing the maintenance information on an internal structure of the abnormal device, a maintenance worker can easily grasp the target of the maintenance work and the content of the maintenance work.

According to a sixth mode of the present disclosure, in the maintenance support system of any one of the first mode to the fifth mode, at least one of the autonomous mobile bodies includes a photographing unit configured to photograph the devices, and the terminal is configured to receive image data corresponding to the abnormal device that is photographed by the photographing unit, and associates the image data that is received with the abnormality information and stores the image data in a storage unit.

Here, the term "photographing" indicates photographing of both a moving image and a still image.

According to the present mode, the autonomous mobile body includes the photographing unit that photographs the devices, and hence the autonomous mobile body is configured to photograph a state of the entirety or a part of the abnormal device, maintenance work of the abnormal device, which is performed by a maintenance worker, or the like. Moreover, the image data on the photographed abnormal device is associated with the abnormality information, and is stored in the storage unit. Thus, a number of pieces of data relating to the abnormal device can be accumulated, which can help product development in the future and improvement of maintenance service.

According to a seventh mode of the present disclosure, in the maintenance support system of any one of the first mode to the sixth mode, at least one of the autonomous mobile bodies is a flying object.

According to the present mode, the autonomous mobile body travels by flying, and hence is can travel in the air. With this, as compared to that of a road-surface traveling type, the autonomous mobile body can travel a shorter route and arrive at the location of the abnormal device easily in a shorter time period. Moreover, when the autonomous mobile body is in a standby mode at a position higher than the abnormal device after traveling, a maintenance worker can easily recognize the autonomous mobile body, and can easily arrive at the location of the abnormal device.

According to a eighths mode of the present disclosure, in the maintenance support system of any one of the first mode to the seventh mode, at least one of the autonomous mobile bodies includes a movement mechanism and an energy accumulation unit configured to accumulate energy to be applied to the movement mechanism, and when an energy amount in the energy accumulation unit is less than a predetermined amount, the terminal transmits the instruction signal to another autonomous mobile body.

According to the present mode, when an energy amount of the energy accumulation unit is less than a predetermined amount, the terminal transmits the instruction signal to the other autonomous mobile body. Thus, even when the one autonomous mobile body runs out of energy and cannot be heading to the abnormal device, the maintenance support can be performed through use of the other autonomous mobile body.

According to a ninth mode of the present disclosure, in the maintenance support system of the eighth mode, when receiving failure information from one autonomous mobile body, the terminal transmits the instruction signal to another autonomous mobile body.

According to the present mode, even when the one autonomous mobile body has a failure, maintenance support can be performed through use of the other autonomous mobile body.

According to a tenth mode of the present disclosure, in the maintenance support system of any one of the first mode to the ninth mode, a plurality of autonomous mobile bodies are provided, and the plurality of autonomous mobile bodies are configured to deal with the plurality of devices.

Here, the expression "the plurality of autonomous mobile bodies are configured to deal with the plurality of devices" indicates that, when abnormality is caused simultaneously in the plurality of devices, the plurality of autonomous mobile bodies are assigned and configured to take an action of traveling to the locations of the abnormal devices, respectively.

According to the present mode, the plurality of autonomous mobile bodies are provided, and the plurality of autonomous mobile bodies are configured to deal with the plurality of devices. Thus, even when abnormality is caused simultaneously in the plurality of devices, maintenance support can be performed smoothly.

According to a eleventh mode of the present disclosure, in the maintenance support system of any one of the first mode to the tenth mode, the maintenance support region is divided into a plurality of regions, autonomous mobile bodies are respectively assigned to each of the plurality of regions, and the terminal transmits the instruction signal to an autonomous mobile body assigned to a region in which the abnormal device is present.

According to the present mode, when the maintenance support region is divided into the plurality of regions, the autonomous mobile bodies are respectively assigned to each of the plurality of regions. Thus, for example, even when abnormality is caused in a region different from the region in which the terminal is installed, maintenance support can be performed effectively.

According to a twelfth mode of the present disclosure, in the maintenance support system of any one of the first mode to the eleventh mode, at least one of the plurality of devices is a printing device including a conveyance unit configured to convey a medium and a printing unit configured to perform printing on the medium that is conveyed.

According to the present mode, when abnormality is caused in the printing device, the effects in each of the modes can be obtained with the maintenance support system.

According to a thirteenth mode of the present disclosure, a terminal to be used in a maintenance support system configured to support maintenance of a plurality of devices, the terminal includes a storage unit configured to store device location information relating to the plurality of devices, a reception unit configured to receive abnormality information from an abnormal device being a device, among the plurality of devices, with an abnormality, and a transmission unit configured to, when receiving the abnormality information, transmit an instruction signal for causing at least one unmanned mobile body, that is configured to move, to travel to a location at which the abnormal device is installed, based on the device location information.

According to the present mode, the maintenance support system according to each of the modes can be achieved easily.

Subsequently, the configurations, the actions, and the effects of the present exemplary embodiment of the present disclosure will be described below with reference to the drawings. First, a maintenance support system according to a first exemplary embodiment of the present disclosure will be described with reference to FIG. 1 and FIG. 2. Subsequently, a second exemplary embodiment of the present disclosure will be described with reference to FIG. 3.

First Exemplary Embodiment

Maintenance Support System

Figure 1:
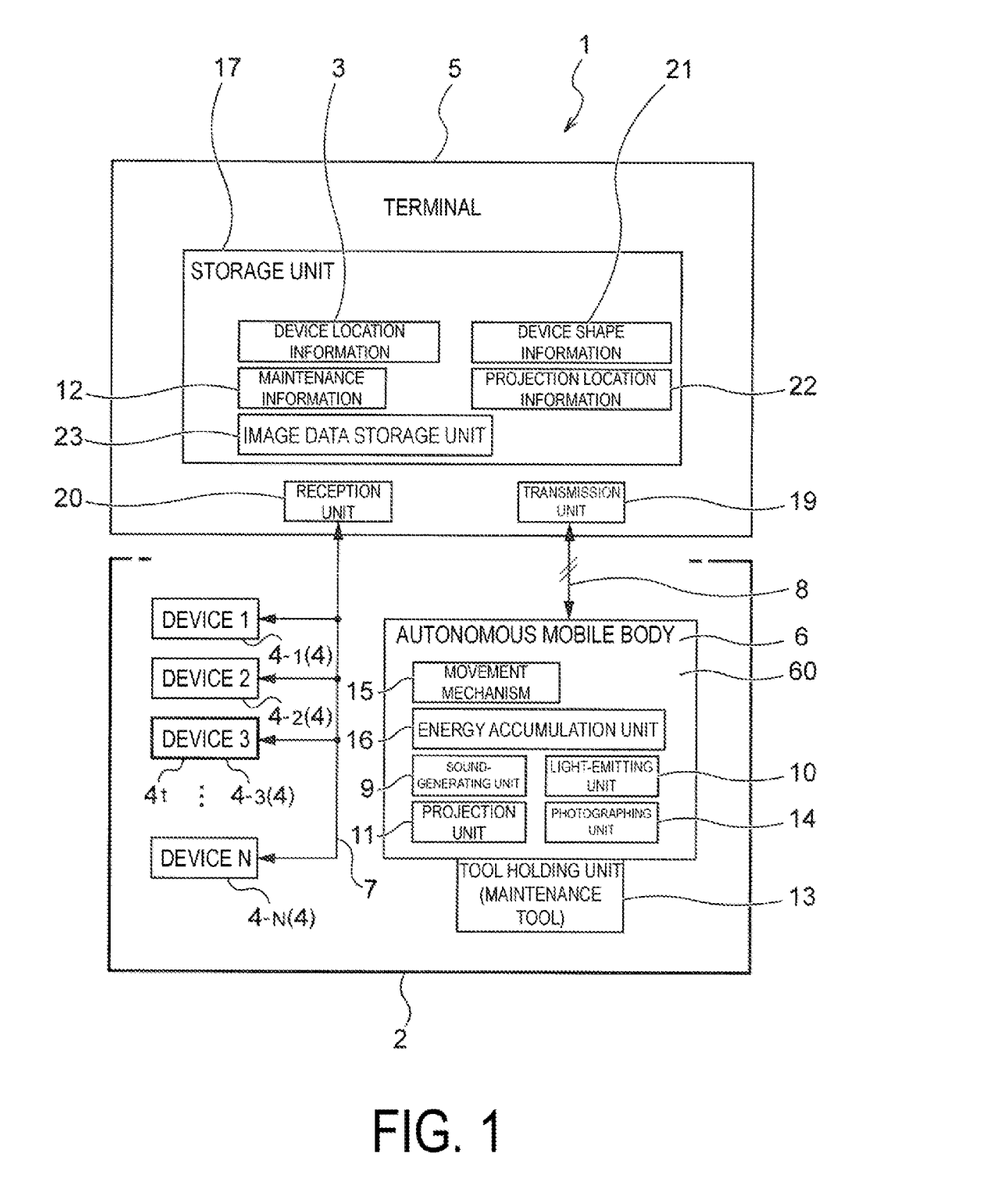
FIG. 1 is a block diagram of a maintenance support system according to a first exemplary embodiment of the present disclosure.

As illustrated in FIG. 1, a maintenance support system 1 according to the first exemplary embodiment includes a terminal 5 and one or more autonomous mobile bodies 6 capable of receiving an instruction signal from the terminal 5. The terminal 5 manages device location information 3 relating to a plurality of devices 4 including a device 4-1, a device 4-2, a device 4-3, . . . , and a device 4-N in a maintenance support region 2, and is capable of receiving abnormality information from an abnormal device 4t among the plurality of devices 4. "N" described above is a positive integer. Further, in this description, it is assumed that a device 4-3 corresponds to the abnormal device 4t.

Further, when receiving the abnormality information, the terminal 5 transmits the abnormality information to the autonomous mobile body 6, and the autonomous mobile body 6 that receives the information travels to the location of the abnormal device 4t, based on the abnormality information.

In the first exemplary embodiment, the terminal 5 and the autonomous mobile body 6 are capable of performing transmission and reception via a wireless network 8.

Maintenance Support Region and Devices

The maintenance support region 2 corresponds to a factory in operation with a number of devices 4 installed therein. For example, a printing factory in which a plurality of printers, namely, printing devices are installed as the devices 4 is exemplified. The maintenance support region 2 may be a factory that further includes post-processing devices installed therein, which perform post-processing such as surface coating processing to media on which printing is performed by the printers. Each of the printing devices includes a conveyance unit capable of conveying a medium and a printing unit that performs printing on the conveyed medium.

The printing unit includes an ink jet head that records a character by ejecting a liquid droplet such as ink on to a surface of the medium. The conveyance unit includes, for example, a conveyance roller pair that nips the medium and conveys the medium to the printing unit, a sheet feeding unit that sends the medium to the conveyance roller pair, and a sheet discharging unit that discharges the medium on which printing is completed. When the printer performs printing on the medium drawn out from a roll body, the sheet feeding unit corresponds to, for example, an unwinding unit that unwinds the medium wound around the roll body.

The types of the plurality of devices 4 are not limited to devices relevant to the printers, the post-processing devices, and the like, and as a matter of course, include other kinds of devices. In the first exemplary embodiment, the devices 4 are connected to the terminal 5 by lines 7, and various signals can be transmitted and received via the lines 7.

Note that, the devices 4 can be used in a sustainable manner by maintenance work such as replacement of consumables and failure repairing.

Further, in the first exemplary embodiment, each of the devices 4 includes a publicly-known self-diagnosis unit that detects abnormality by its own. When the self-diagnosis unit detects abnormality, the abnormality information is transmitted to the terminal 5. Note that, the devices 4 may not include the self-diagnosis units, and the devices 4 may access the terminal 5 via the lines 7 to regularly confirm presence or absence of abnormality.

Here, the abnormality information transmitted from the device 4 is location information relating to at least the location of the device 4 with abnormality. In the first exemplary embodiment, information of an abnormality type specified based on the self-diagnosis unit is further contained. With this, maintenance information 12 described later can be used effectively.

Autonomous Mobile Body

In the first exemplary embodiment, the autonomous mobile body 6 corresponds to an unmanned flying object 60 such as a drone, which is capable of receiving an instruction signal transmitted from the terminal 5 via the wireless network 8. As the autonomous mobile body 6, a mobile body of a road-surface traveling type may be adopted. In view of mobility, the flying object 60 such as a drone is preferred. When the plurality of autonomous mobile bodies 6 are provided, a combination including at least one flying object 60 is preferably provided.

In the first exemplary embodiment, as illustrated in FIG. 1, the autonomous mobile body 6 includes a sound-generating unit 9 that generates sound such as buzzer and a light-emitting unit 10. A configuration in which any one of the sound-generating unit 9 and the light-emitting unit 10 is provided may be adopted. Further, the sound-generating unit 9 generates sound, and the light-emitting unit 10 emits light after traveling to the location of the abnormal device 4t.

Note that, not only after traveling to the location of the abnormal device 4t but also during the travel, at least one of sound and light may be generated.

In the first exemplary embodiment, as illustrated in FIG. 1, the autonomous mobile body 6 includes a projection unit 11 capable of projecting an image of a moving image or of a still image. The image corresponds to the maintenance information 12 relating to an abnormality solution for the abnormal device 4t. The maintenance information 12 is image information that describes procedures or the like for solving abnormality of the abnormal device 4t. As the projection unit 11, for example, a projector is exemplified.

The maintenance information 12 is stored in the terminal 5, which is described later in detail.

In the first exemplary embodiment, as illustrated in FIG. 1. the autonomous mobile body 6 includes a tool holding unit 13 capable of conveying a maintenance tool used for maintenance of the abnormal device 4t. The tool holding unit 13 is only required to enable the autonomous mobile body 6 to hold and convey the maintenance tool to the location of the abnormal device 4t, and is not limited to a specific structure.

Further, the autonomous mobile body 6 includes a photographing unit 14 capable of photographing the devices 4. Here, the term "photographing" indicates photographing of both a moving image and a still image. The photographing unit 14 is capable of photographing a state of the entirety or a part of the abnormal device 4t, maintenance work of the abnormal device 4t, which is performed by a maintenance worker, or the like. The image data photographed by the photographing unit 14 is transmitted to the terminal 5.

In the first exemplary embodiment, as illustrated in FIG. 1. the autonomous mobile body 6 includes the movement mechanism 15 and an energy accumulation unit 16 that accumulate energy to be applied to the movement mechanism 15. In a case of the flying object such as a drone, the movement mechanism 15 corresponds to flight propellers and a drive mechanism for the propellers. When the autonomous mobile body 6 is a road-surface traveling type, the movement mechanism 15 corresponds to wheels and a drive mechanism for the wheels. As the energy to be applied to the movement mechanism 15, various types of energy such as a liquid fuel, a gas fuel, and the like before being converted to electricity, for example, chemical energy obtained by a fossil fuel can be exemplified in addition to an electric energy from a battery. Mass energy obtained by a nuclear fuel can be exemplified.

The energy accumulation unit 16 may include a rechargeable battery and a liquid fuel battery, but is not limited thereto. A kerosene tank for radio control and the like can be exemplified.

Terminal

The terminal 5 includes a storage unit 17, a reception unit 20, and a transmission unit 19. The storage unit 17 stores the device location information 3 relating to the plurality of devices 4. The reception unit 20 is capable of receiving the abnormality information from the abnormal device 4t being a device, among the plurality of devices 4, with an abnormality. When the abnormality information is received, the transmission unit 19 is capable of transmitting an instruction signal for causing at least one of the autonomous mobile bodies 6, that are capable of moving, to travel to the installation location of the abnormal device 4t, based on the device location information 3.

In the first exemplary embodiment, the abnormality information from the abnormal device 4t is transmitted to the reception unit 20 of the terminal 5 via the lines 7.

The storage unit 17 of the terminal 5 stores, in a ROM (not shown), the device location information 3 relating to the plurality of devices 4. The device location information 3 is information relating to a location of each of the device 4-1, the device 4-2, the device 4-3, . . . , and the device 4-N in a maintenance region map obtained by making the maintenance support region 2 into coordinates. When receiving the abnormality information of the device 4 via the reception unit 20, the terminal 5 causes a processing unit to specify the location of the abnormal device 4t with an arithmetic program or the like stored in a RAM of the storage unit 17 by comparing the location information in the abnormality information with the device location information 3. The autonomous mobile body 6 receives the information of the location of the abnormal device 4t, and travels to the location.

Maintenance Information

In the first exemplary embodiment, as illustrated in FIG. 1, the storage unit 17 further stores, in the ROM of the storage unit 17, the maintenance information 12 being image information relating to an abnormality solution for an abnormal device. In the maintenance information 12, hypothetical abnormality types are classified based on abnormality events that occurred in the past, and are stored in a form of table data. The maintenance information 12 preferably contains information of a maintenance tool required for maintenance work or the like in addition to information in a form of characters, figures, images, and moving images, which relates to a work content, a work procedure, and the like required for each maintenance work.

The maintenance information 12 corresponding to the abnormality type is picked up from the table, based on the information of the abnormality type in the abnormality information. The projection unit 11 projects the information after the autonomous mobile body 6 arrives at the location of the abnormal device 4t. Here, the processing unit picks up the maintenance information 12 corresponding to the abnormality type with the arithmetic program or the like stored in the RAM of the storage unit 17.

Note that, when the abnormality information transmitted from the device 4 contains only the location information of the location of the abnormal device 4t but does not contain the information of the abnormality type, a maintenance worker understands contents of the abnormality by his or her own after arriving at the location of the abnormal device 4t, and picks up the corresponding maintenance information 12 from the table of the maintenance information 12.

When a new type of abnormality occurred, the maintenance information 12 is preferably capable of being updated by adding the new type of abnormality.

In the first exemplary embodiment, as illustrated in FIG. 1. the terminal 5 manages shape information 21 on the devices 4, and includes projection location information 22 associated with the abnormality information of the abnormal device 4t based on the shape information 21. The projection unit 11 projects the maintenance information 12, based on the projection location information 22.

The shape information 21 is literally information of the shape of the device 4. The projection location information 22 is information corresponding to the projection location of the maintenance information 12, which is determined based on the shape information 21, for the purpose of facilitating the maintenance work in accordance with the abnormality type of the abnormality information of each of the devices 4. Specifically, the projection location of the maintenance information 12 is set to an abnormal part or the vicinity of the abnormal part of the abnormal device 4t being a maintenance target. For example, when the abnormal device 4t is a printer, it is assumed that a conveyance failure occurs due to jamming of the medium in the sheet discharging unit. In this case, based on the shape information 21, the terminal 5 grasps a part of a main body of the printer to which the sheet discharging unit is provided. Therefore, the projection location of the maintenance information 12 is the sheet discharging unit being an abnormal part or the vicinity of the part. Here, the processing unit determines the location of projection performed by the projection unit 11 with the arithmetic program or the like stored in the RAM of the storage unit 17, based on the abnormality information.

In the first exemplary embodiment, as illustrated in FIG. 1. the terminal 5 is capable of receiving the image data obtained by recording a state of the maintenance work for the abnormal device 4t, which is photographed by the photographing unit 14. Further, the received image data is associated with the abnormality information, and is stored in an image data storage unit 23 of the storage unit 17.

In the first exemplary embodiment, as illustrated in FIG. 1, when an energy amount in the energy accumulation unit 16 of one autonomous mobile body 6 is less than a predetermined amount, the terminal 5 transmits the instruction signal relating to the abnormal device 4t to another autonomous mobile body 6, that is, transmits an instruction signal indicating the maintenance information for causing the other autonomous mobile body 6 to travel to the location of the abnormal device 4t or performing projection.

The energy amount in the energy accumulation unit 16 may be managed under the terminal 5, or may be managed by the autonomous mobile body 6 itself. In the latter case, one drone may directly transmit information to another drone.

Operation of Maintenance Support System

Figure 2:
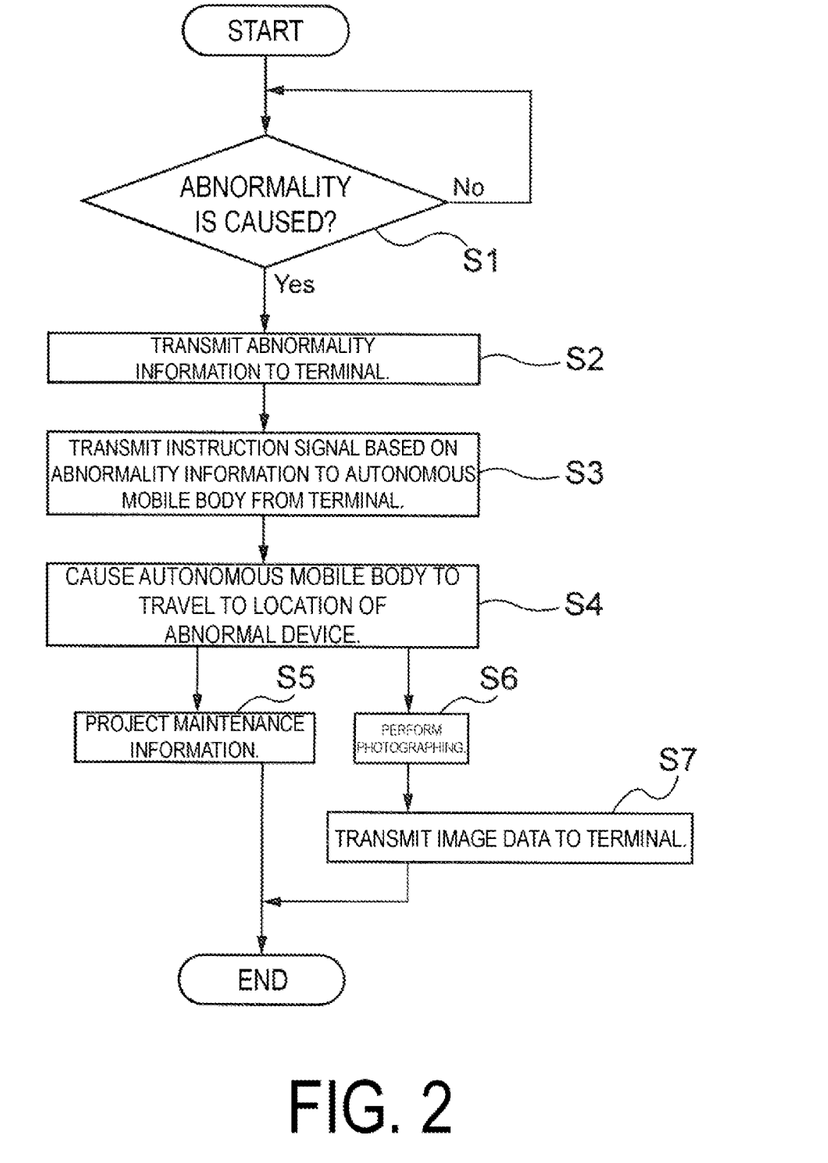
FIG. 2 is a flowchart of the maintenance support system according to the first exemplary embodiment.

With reference to the flowchart of FIG. 2, a maintenance support operation of the maintenance support system 1, that is, a flow of the support will be described.

First, in a determination step, Step S1 proceeds to Step S2 when abnormality occurs among the devices 4. In Step S2, the abnormality information is transmitted from the abnormal device 4t to the terminal 5. Further, the procedure proceeds to Step S3. The instruction signal based on the abnormality information is transmitted from the terminal 5 to the autonomous mobile body 6. Further, the procedure proceeds to Step S4. The autonomous mobile body 6 compares the abnormality information with the device location information 3, grasps the location of the abnormal device 4t, and travels to the location. At this time, in the first exemplary embodiment, the autonomous mobile body 6 is capable of carry the maintenance tool to the location of the abnormal device 4t.

A maintenance worker goes to the location of the abnormal device 4t with the traveling autonomous mobile body 6 as a guide. Further, when the sound-generating unit 9 generates sound or the light-emitting unit 10 emits light, such sound and light may also be guides.

In the first exemplary embodiment, in Step S5, the projection unit 11 included in the autonomous mobile body 6 projects the maintenance information on the abnormal device 4t. A maintenance worker can perform maintenance work with the maintenance tool by following the projected maintenance information. When the maintenance work is completed, information indicating the completion is transmitted from the device 4 to the terminal 5 via the lines 7.

Further, in the first exemplary embodiment, in Step S6, the photographing unit 14 included in the autonomous mobile body 6 photographs the state of the maintenance work as an image. Subsequently, the procedure proceeds to Step S7. The image photographed by the photographing unit 14 is transmitted as the image data to the terminal 5, and is stored in the storage unit 17.

Description on Actions and Effects of First Exemplary Embodiment

With the maintenance support system according to the first exemplary embodiment, when receiving the abnormality information of the device 4, the terminal 5 transmits the abnormality information to the autonomous mobile body 6. Moreover, the autonomous mobile body 6 compares the abnormality information with the device location information 3, specifies the location of the abnormal device 4t, and travels to the location. With this, a maintenance worker can make a move with the autonomous mobile body 6 as a guide, and hence can quickly grasp the location of the abnormal device 4t and go to the location.

Further, the autonomous mobile body 6 includes at least one of the sound-generating unit 9 and the light-emitting unit 10, and hence is capable of informing a maintenance worker of the location of the abnormal device 4t by generating one of or both sound and light after traveling to the location of the abnormal device 4t. With this, a maintenance worker can easily recognize the location of the autonomous mobile body 6, and hence can quickly go to the location of the abnormal device 4t. Not only after traveling to the location of the abnormal device 4t but also during the travel, it is further preferred that one or both of the sound and the light be generated.

Further, the projection unit 11 is capable of projecting the maintenance information 12 relating the abnormality solution for the abnormal device 4t, and hence a maintenance worker can grasp the work content and the work procedure for maintenance from the maintenance information 12 projected on the location of the abnormal device 4t. With this, a maintenance worker can perform maintenance work effectively because the worker does not need to browse documents and the like during the maintenance work.

Further, the autonomous mobile body 6 is capable of conveying the maintenance tool, and hence a maintenance worker does not need to carry the maintenance tool required for the maintenance work by his or her own. Specifically, a maintenance worker can go to the location to which the autonomous mobile body 6 travels, that is, the location of the abnormal device 4t, with light equipment.

Further, when the autonomous mobile body 6 projects the maintenance information 12 on the abnormal device 4t, the projection unit 11 performs projection, based on the projection location information 22. Thus, the maintenance information 12 can be projected on the abnormal part of the abnormal device 4t. With this, a maintenance worker can easily grasp the part with abnormality and the maintenance information 12. Further, by superposing the maintenance information 12 on an internal structure of the abnormal device 4t, a maintenance worker can easily grasp the target of the maintenance work and the content of the maintenance work.

Further, the autonomous mobile body 6 includes the photographing unit 14 that photographs the devices 4, and hence the autonomous mobile body 6 is capable of photographing a state of the entirety or a part of the abnormal device 4t, maintenance work of the abnormal device 4t, which is performed by a maintenance worker, or the like. Moreover, the image data on the photographed abnormal device 4t is associated with the abnormality information, and is stored in the image data storage unit 23 of the storage unit 17. Thus, a number of pieces of data relating to the abnormal device 4t can be accumulated, which can help product development in the future and improvement of maintenance service.

Further, the autonomous mobile body 6 is a flying object that travels by flying, and hence can travel in the air. With this, as compared to that of a road-surface traveling type, the autonomous mobile body 6 is capable of traveling a shorter route and arriving at the location of the abnormal device 4t easily in a shorter time period. Moreover, when the autonomous mobile body 6 is in a standby mode at a position higher than the abnormal device 4t after traveling, a maintenance worker can easily recognize the autonomous mobile body 6, and can easily arrive at the location of the abnormal device 4t.

Further, when an energy amount of the energy accumulation unit 16 of one autonomous mobile body 6 is less than a predetermined amount, the terminal 5 transmits the instruction signal to another autonomous mobile body 6. Thus, even when the one autonomous mobile body 6 runs out of energy and cannot be heading to the abnormal device 4t, the maintenance support can be performed through use of the other autonomous mobile body 6.

Second Exemplary Embodiment

Figure 3:
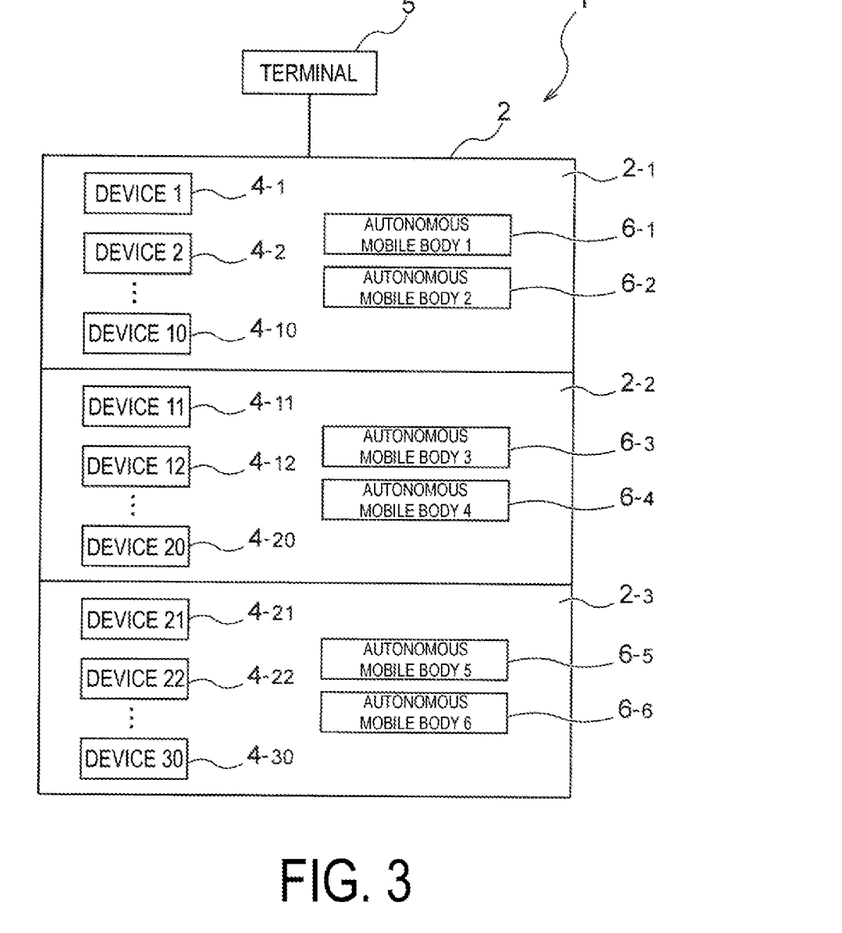
FIG. 3 is a block diagram of a maintenance support system according to a second exemplary embodiment of the present disclosure.

As illustrated in FIG. 3, in a maintenance support system 1 according to the second exemplary embodiment, a plurality of autonomous mobile bodies 6 are provided, and the plurality of autonomous mobile bodies 6 are capable of dealing with the plurality of devices 4. Here, the plurality of autonomous mobile bodies 6 are capable of dealing with the plurality of devices 4, which indicates that, when abnormality is caused simultaneously in the plurality of devices 4, the plurality of autonomous mobile bodies 6 are assigned and capable of taking an action of traveling to the locations of the abnormal devices 4t, respectively.

Further, in the second exemplary embodiment, the maintenance support region 2 is divided into a plurality of regions, and the autonomous mobile body 6 are respectively assigned to each of the plurality of regions. The terminal 5 transmits the instruction signal to the autonomous mobile body 6 assigned to a region in which the abnormal device is present.

Here, the term "the plurality of regions" in the expression "the maintenance support region is divided into the plurality of regions" indicates a case where a region can be divided into a plurality of regions in accordance with floors of a building, a security zone, a fee-charging zone, a tenant zone in one floor, or the like in addition to a case where a floor area is so large that the area can be divided into a plurality of regions.

In the second exemplary embodiment, the maintenance support region 2 is divided into three maintenance support regions 2-1, 2-2, and 2-3. In the maintenance support region 2-1, autonomous mobile bodies 6, specifically, two autonomous mobile bodies 6-1 and 6-2 are assigned to ten devices 4, specifically, devices 4-1 to 4-10.

In the maintenance support region 2-2, autonomous mobile bodies 6, specifically, two autonomous mobile bodies 6-3 and 6-4 are assigned to ten devices 4, specifically, devices 4-11 to 4-20.

In the maintenance support region 2-3, autonomous mobile bodies 6, specifically, two autonomous mobile bodies 6-5 and 6-6 are assigned to ten devices 4, specifically, devices 4-21 to 4-30.

The other configurations are the same as those in of the first exemplary embodiment, and hence description therefor is omitted.

In the second exemplary embodiment, the plurality of autonomous mobile bodies 6 are provided, and the plurality of autonomous mobile bodies 6 are capable of dealing with the plurality of devices 4. Thus, even when abnormality is caused simultaneously in the plurality of devices, maintenance support can be performed smoothly.

Further, when the maintenance support region 2 is divided into the plurality of regions, the autonomous mobile bodies 6 are respectively assigned to each of the plurality of regions. Thus, for example, even when abnormality is caused in a region different from the region in which the terminal 5 is installed, maintenance support can be performed effectively.

Other Exemplary Embodiments

The maintenance support system 1 according to the exemplary embodiments of the present disclosure is based on the configuration described above. However, as a matter of course, modifications, omission, and the like may be made to a partial configuration without departing from the gist of the disclosure of the present application.

(1) When receiving failure information from one autonomous mobile body 6, the terminal 5 may transmit the instruction signal to another autonomous mobile body 6. With this, even when the one autonomous mobile body 6 has a failure, maintenance support can be performed through use of the other autonomous mobile body 6.

(2) When the autonomous mobile bodies 6 are capable of communicating with the other autonomous mobile bodies 6, maintenance support can be carried out with the autonomous mobile bodies 6 cooperating with each other.

What is claimed is:

1. A maintenance support system, comprising:
a terminal configured to store device location information and shape information of a plurality of devices present in a maintenance support region and receive abnormality information from an abnormal device among the plurality of devices, the device location information including a location of each device, and the shape information including a shape of each device; and
one or more autonomous mobile bodies configured to receive an instruction signal transmitted from the terminal, wherein
the terminal:
  determines maintenance information based on the abnormality information,
  determines projection location information based on the shape information and the maintenance information, and
  transmits the device location information, shape information, maintenance information, projection location information, and abnormality information to the autonomous mobile body when receiving the abnormality information, and
the autonomous mobile body having a projection unit configured to project a moving image or still image:
  travels to a location of the abnormal device, based on the abnormality information and the device location information, and projects, by the projection unit, the maintenance information at a projection location of the abnormal device based on the projection location information.

2. The maintenance support system according to claim 1, wherein at least one of the autonomous mobile bodies includes at least one of a sound-generating unit configured to generate sound and a light-emitting unit configured to emit light at least after traveling to the location of the abnormal device.

3. The maintenance support system according to claim 1, wherein at least one of the autonomous mobile bodies is configured to convey a maintenance tool.

4. The maintenance support system according to claim 1, wherein at least one of the autonomous mobile bodies includes a photographing unit configured to photograph the devices, and the terminal is configured to receive image data corresponding to the abnormal device that is photographed by the photographing unit, and associates the image data that is received with the abnormality information and stores the image data in a storage unit.

5. The maintenance support system according to claim 1, wherein at least one of the autonomous mobile bodies is a flying object.

6. The maintenance support system according to claim 1, wherein at least one of the autonomous mobile bodies includes a movement mechanism and an energy accumulation unit configured to accumulate energy to be applied to the movement mechanism, and when an energy amount in the energy accumulation unit is less than a predetermined amount, the terminal transmits the instruction signal to another autonomous mobile body.

7. The maintenance support system according to claim 6, wherein when receiving failure information from one autonomous mobile body, the terminal transmits the instruction signal to another autonomous mobile body.

8. The maintenance support system according to claim 1, wherein a plurality of autonomous mobile bodies are provided, and the plurality of autonomous mobile bodies are configured to deal with the plurality of devices.

9. The maintenance support system according to claim 1, wherein the maintenance support region is divided into a plurality of regions, autonomous mobile bodies are respectively assigned to each of the plurality of regions, and the terminal transmits the instruction signal to an autonomous mobile body assigned to a region in which the abnormal device is present.

10. The maintenance support system according to claim 1, wherein at least one of the plurality of devices is a printing device including a conveyance unit being configured to convey a medium and a printing unit configured to perform printing on the medium that is conveyed.

11. A terminal to be used in a maintenance support system configured to support maintenance of a plurality of devices, the terminal comprising:

a storage unit configured to store device location information and shape information relating to the plurality of devices, the device location information including a location of each device, and the shape information including a shape of each device;

a reception unit being configured to receive abnormality information from an abnormal device being a device, among the plurality of devices, with an abnormality;

a processing unit configure to:
determine maintenance information based on the abnormality information;
determine projection location information based on the shape information and the maintenance information; and a transmission unit configured to, when receiving the abnormality information, transmit the device location information, the maintenance information, the shape information, and the projection location information to at least one unmanned mobile body, causing the at least one unmanned mobile body, that is configured to move, to travel to a location at which the abnormal device is installed, based on the device location information and project the maintenance information at a projection location of the abnormal device based on the projection location information.

* * * * *